(12) United States Patent  Komoto (10) Patent No.: US 6,307,165 B1
(45) Date of Patent: Oct. 23, 2001

(54) ELECTRONIC BALANCE (75) Inventor: Akira Komoto, Ohtu (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/444,415

(22) Filed: Nov. 22, 1999

(30) Foreign Application Priority Data

Nov. 30, 1998 (JP) ................................................. 10-338954

(51) Int. Cl.$^7$ ....................................................... G01G 3/08
(52) U.S. Cl. .......................................................... 177/229
(58) Field of Search ....................... 177/229; 73/862.633, 73/862.634, 862.638, 862.639

(56) References Cited

U.S. PATENT DOCUMENTS

| | | | |
|---|---|---|---|
| 4,632,198 | * 12/1986 | Uchimura | 177/229 |
| 4,690,230 | * 9/1987 | Uchimura et al. | 177/229 |
| 4,813,505 | * 3/1989 | Sö dler et al. | 177/229 |
| 5,183,125 | * 2/1993 | Schurr | 177/229 |
| 5,646,375 | * 7/1997 | Neuman | 177/229 |
| 5,736,685 | * 4/1998 | Nakajima | 177/145 |

* cited by examiner

*Primary Examiner*—Randy W. Gibson
(74) *Attorney, Agent, or Firm*—Oblon, Spivak, McClelland, Maier & Neustadt, P.C.

(57) ABSTRACT

An electronic balance including a first Roberval's chain, a second Roberval's chain connected to the first Roberval's chain, and a detector. The first Roberval's chain includes a first fixed pillar, a plurality of first beams, and a first movable pillar supported by the first fixed pillar via the plurality of first beams. The first beams extends substantially in parallel with each other and in a first extending direction. The first movable pillar is configured to receive a load to be measured. The second Roberval's chain includes a second fixed pillar, a plurality of second beams, and a second movable pillar supported by the second fixed pillar via the plurality of second beams. The plurality of second beams extends substantially in parallel with each other and in a second extending direction substantially perpendicular to the first extending direction of the plurality of first beams. The second movable pillar is connected to the first movable pillar. The detector is configured to detect the load electrically via a movement of the first movable pillar.

23 Claims, 9 Drawing Sheets

ELECTRONIC BALANCE

CROSS-REFERENCE TO RELATED APPLICATIONS

The present application claims priority under 35 U.S.C. §119 to Japanese Patent Application No. 10-338,954, filed Nov. 30, 1998, entitled "Electronic Balance." The contents of that application are incorporated herein by reference in their entirety.

BACKGROUND OF THE INVENTION

1. Field of the Invention

The present invention relates to an electronic balance which includes a plurality of Roberval's chains.

2. Discussion of the Background

Many of conventional electronic balances and scales utilize a Roberval's chain (also called a "parallel guide") to support a balance pan in order to limit the movement of the balance pan on which a mass is placed. The Roberval's chain includes a fixed pillar, a movable pillar, and upper and lower beams. The fixed pillar is fixed to or integrated into a frame of the scale. The movable pillar is supported by the fixed pillar via the upper and lower beams which are substantially in parallel with each other. Each beam is connected to the fixed pillar at one end and to the movable pillar at the other end through each fulcrum. The movable pillar supports the balance pan. Thus, the load applied to the balance pan is transmitted to an electric load detector through the movable pillar and a lever.

Japanese Unexamined Utility Model Publication (Kokai) No. 63-35,924 discloses a Roberval's chain which is constructed by assembling separate pieces of a fixed pillar, a movable pillar, and upper and lower beams. Japanese Unexamined Patent Publication (Kokai) No. 63-277,936 discloses a Roberval's chain which has a single piece construction carved out from a single flat plate. The contents of these references are incorporated herein by reference in their entirety.

In these balances, however, it is difficult to make an adjustment because an adjustment of an offset error in the longitudinal direction of the upper and lower beams affects an offset error in the transverse direction of the upper and lower beams or vise versa.

SUMMARY OF THE INVENTION

According to one aspect of the invention, an electronic balance includes a first Roberval's chain, a second Roberval's chain connected to the first Roberval's chain, and a detector. The first Roberval's chain includes a first fixed pillar, a plurality of first beams, and a first movable pillar supported by the first fixed pillar via the plurality of first beams. The first beams extends substantially in parallel with each other and in a first extending direction. The first movable pillar is configured to receive a load to be measured. The second Roberval's chain includes a second fixed pillar, a plurality of second beams, and a second movable pillar supported by the second fixed pillar via the plurality of second beams. The plurality of second beams extends substantially in parallel with each other and in a second extending direction substantially perpendicular to the first extending direction of the plurality of first beams. The second movable pillar is connected to the first movable pillar. The detector is configured to detect the load electrically via a movement of the first movable pillar.

According to another aspect of the invention, a scale includes a housing and an electronic balance provided in the housing. The housing has a circumferential portion, and first and second side portions at both ends of the circumferential portion. The electronic balance includes a first Roberval's chain, a second Roberval's chain connected to the first Roberval's chain, and a detector. The first Roberval's chain includes a first fixed pillar fixed to the housing, a plurality of first beams, and a first movable pillar supported by the first fixed pillar via the plurality of first beams. The first beams extends substantially in parallel with each other and in a first extending direction. The first movable pillar is configured to receive a load to be measured. The second Roberval's chain includes a second fixed pillar fixed to the housing, a plurality of second beams, and a second movable pillar supported by the second fixed pillar via the plurality of second beams. The plurality of second beams extends substantially in parallel with each other and in a second extending direction substantially perpendicular to the first extending direction of the plurality of first beams. The second movable pillar is connected to the first movable pillar. The detector is configured to detect the load electrically via a movement of the first movable pillar.

BRIEF DESCRIPTION OF THE DRAWINGS

A more complete appreciation of the invention and many of the attendant advantages thereof will become readily apparent with reference to the following description, particularly when considered in conjunction with the accompanying drawings, in which.

DESCRIPTION OF THE PREFERRED EMBODIMENTS

The preferred embodiments will now be described with reference to the accompanying drawings, wherein like reference numerals designate corresponding or identical elements throughout the various drawings.

Figure 1:
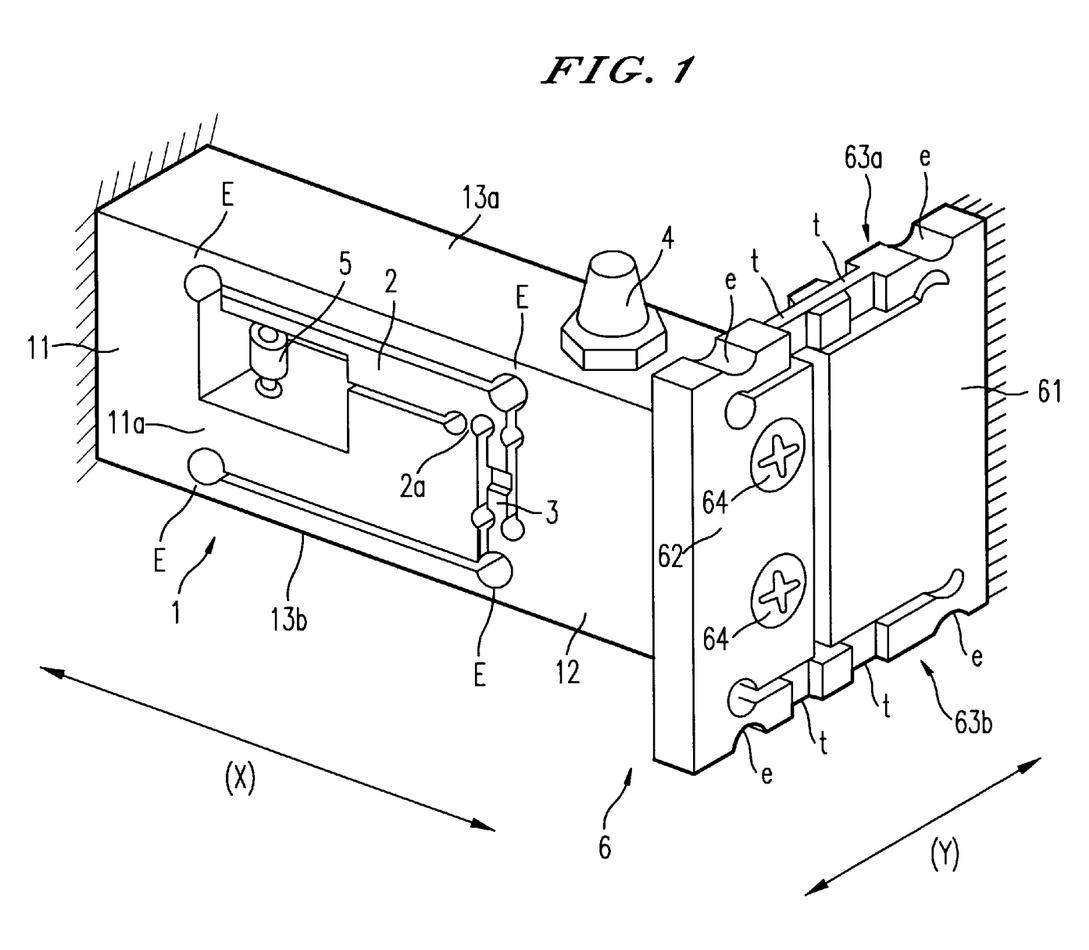
FIG. 1 is a perspective view of first and second Roberval's chains of an electronic balance according to a first embodiment of the present invention.
Figure 2:
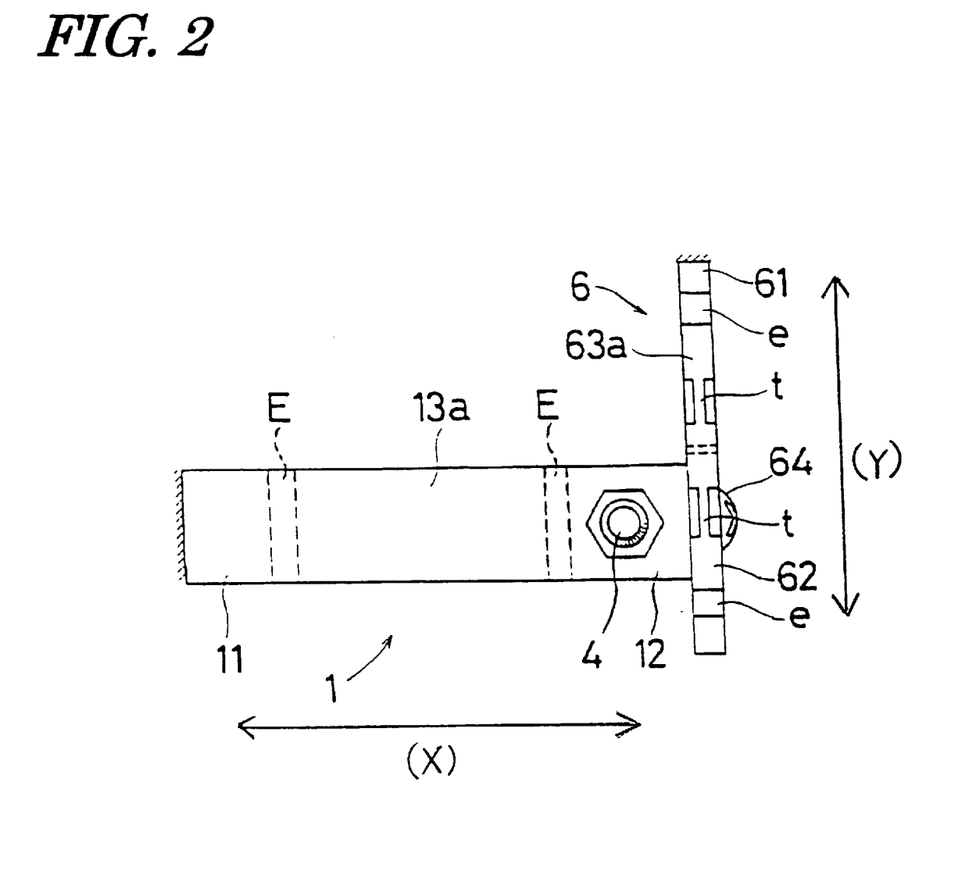
FIG. 2 is a top plan view of the first and second Roberval's chains shown in FIG. 1.

FIG. 1 is a perspective view of first and second Roberval's chains (or parallel guides) of an electronic balance according to a first embodiment of the present invention, and FIG. 2 is a top plan view of the first and second Roberval's chains shown in FIG. 1. Referring to FIGS. 1 and 2, the first Roberval's chain 1 includes a first fixed pillar 11, a first movable pillar 12, and first upper and lower beams (13a and 13b). The first upper and lower beams (13a and 13b) extend substantially in a first direction (X) and substantially in parallel with each other. The first upper and lower beams (13a and 13b) connect the first fixed pillar 11 and the movable pillar 12. A fulcrum (E) is formed at both ends of each of the first beams (13a and 13b). The first Roberval's chain 1 of the first embodiment is formed by carving or making slits in a single flat plate which has an even cross-section. Similarly, a lever 2, a fulcrum (2a) for the lever 2, and a connecting member 3 are formed by carving or making slits in the single flat plate. The connecting member 3 connects the lever 2 and the first movable pillar 12.

A balance pan receiver 4 for supporting a balance pan 9 (see FIG. 7) is provided on, for example, fixed to the top of the first movable pillar 12. The first fixed pillar 11 has an extended portion (11a) which extends along the first direction (X). A load sensor 5 is provided between the lever 2 and the extended portion (11a) of the first fixed pillar 11. The load sensor 5 is, for example, a tuning fork type, a string vibration type or the like. Further, an electromagnetic restoring system may be used as the load sensor 5. In the electromagnetic restoring system, feedback control of a servomotor is carried out based on an output from a displacement sensor. In the string vibration type, a vibrator vibrates a string. A load applied to the balance pan 9 (see FIG. 7) is transmitted to the first movable pillar 12 and then tilts the lever 2 via the connecting member 3. Subsequently, the tilt of the lever 2 is detected by the load sensor 5 which in turn sends an electric signal in proportion to the load which is applied to the balance pan 9 (see FIG. 7).

The second Roberval's chain 6 also includes a second fixed pillar 61, a second movable pillar 62, and second upper and lower beams (63a and 63b). The second upper and lower beams (63a and 63b) extend substantially in a second direction (Y) and substantially in parallel with each other. The second upper and lower beams (63a and 63b) connect the second fixed and movable pillars (61 and 62). The second Roberval's chain 6 is likewise is formed by carving or making slits in a single piece of a flat plate which has an even cross-section. The first and second movable pillars (12 and 62) are connected by screws 64 such that the longitudinal direction (the first direction (X)) of the first upper and lower beams (13a and 13b) and the longitudinal direction (the second direction (Y)) of the second upper and lower beams (63a and 63b) are substantially in perpendicular.

Each fulcrum (e) is formed at each end of each of the second beams (63a and 63b). Two thin portions (t) which have narrow widths in the first direction (X) are formed between two fulcrums of each of the second beams (63a and 63b).

The first fixed pillar 11 of the first Roberval's chain 1 and the second fixed pillar 61 of the second Roberval's chain 6 are fixed onto a fixed part such as a base or a frame of a scale.

Generally, the Roberval's chain has a function to keep the balance pan from turning over or tilting, and to reduce an "offset error," which is an error caused by an offset load applied on the balance pan. The offset error is reduced by precisely adjusting the parallel degree between the upper and lower beams of the Roberval's chain. In other words, in order to reduce the offset error, the parallel degree between the upper and lower beams is adjusted such that the distances between fulcrums disposed at the both ends of the upper and lower beams are in agreement. The parallel degree described above depends upon the degree of an allowable offset error, i.e., the accuracy of a balance. However, it is usually in the order of 1 $\mu$m to 10 $\mu$m. It is difficult to obtain an acceptable parallel degree simply by processing its parts with precision. Hence, after an electronic balance is assembled, it is necessary to adjust the offset errors while a position of a mass on the balance pan is changed.

Conventionally, to adjust the offset error, with respect to a single Roberval's chain, an offset error in the longitudinal direction of the beam as well as in a direction perpendicular to the longitudinal direction are adjusted, as the position of a mass is changed on the balance pan.

For example, in a Roberval's chain of the single piece construction type, such an adjustment can be achieved by shaving off a part of each fulcrum at the ends of the upper and lower beams, which corresponds to front and back as well as right and left. The Roberval's chain which is provided with adjustment mechanisms which slightly move the positions of fixed points between the fixed pillar and each fulcrum. In such a Roberval's chain, the adjustment mechanisms at corresponding points are adjusted accordingly. Because the single piece construction Roberval's chain has a thin width in the transverse direction of the beams, its strength in the transverse direction is less than that in the longitudinal direction. Accordingly, the single piece construction Roberval's chain is more susceptible to offset errors in the transverse direction. As a result, the Roberval's chain of the single piece construction has a difficulty in dealing with a large weight or supporting a large balance pan.

According to the first embodiment, a tilt or a movement of the balance pan supported by the balance pan receiver 4 is limited by both the first and second Roberval's chains (1 and 6). Accordingly, the offset errors caused by an offset load applied on the balance pan are significantly reduced by the function of the first and second Roberval's chains (1 and 6).

In the first Roberval's chain 1, a distance between the two fulcrums (E) along the first direction (X) (longitudinal direction of the first beams (13a and 13b) is long. Hence the parallel degree between these first beams (13a and 13b) can be adjusted with relative ease, thereby reducing the offset error in the first direction (X) easily. On the contrary, it is difficult to adjust the offset error in the second direction (Y) (a direction perpendicular to the longitudinal direction (X) of the first beams (13a and 13b)), because each first beams (13a and 13b) does not have a large width in the second direction (Y). In the second Roberval's chain 6, it is difficult to adjust the offset error in the first direction (X)(a direction perpendicular to the longitudinal direction of the second beams (63a and 63b)), because each of the first beams (63a and 63b) does not have a large width in the first direction (X). However, because the distance between the two fulcrums (e) along the second direction (Y) (longitudinal direction of the second beams (63a and 63b) is long, the parallel degree between these beams (63a and 63b) can be adjusted with relative ease, thereby reducing the offset error in the second direction (Y) easily.

Therefore, by adjusting only the offset error in the first direction (X) with respect to the first beams (13a and 13b) of the first Roberval's chain 1 and only the offset error in the second direction (Y) with respect to the second beams (63a and 63b) of the second Roberval's chain 6, the first and second Roberval's chains (1 and 6) effectively function to reduce the offset errors caused by the offset load applied to the balance pan. Accordingly, the electronic balance of the first embodiment significantly reduces the offset errors in all directions.

Furthermore, in the second Roberval's chain 6, the thin portions (t) which have narrow widths in the transverse direction (the first direction (X)) of the second beams (63*a* and 63*b*) are formed in each of the second beams (63*a* and 63*b*). Thus, when a load which is offset in the first direction (X) is applied on the balance pan and forces the first movable pillar 12 to tilt in the first direction (X), the second beams (63*a* and 63*b*) flex at the thin portions (t) and prevent distortion between the first and second Roberval's chains (1 and 6). Hence, the effect on the second Roberval's chain 6 due to the load which is offset in the first direction (X) is reduced.

In the first embodiment, the offset error in the transverse direction (the second direction (Y)) of the first Roberval's chain 1 is reduced despite the use of the first Roberval's chain 1 having a relatively low stiffness in the second direction (Y), and the offset errors is easily adjusted.

In the first embodiment, an electronic balance is provided with the second Roberval's chain in addition to the first Roberval's chain. The second Roberval's chain 6 extends in the second direction (Y) substantially perpendicular to the longitudinal direction (the first direction (X)) of the first Roberval's chain 1. The movable pillar 62 of the second Roberval's chain 6 is connected to the first movable pillar (12) of the first Roberval's chain 1. By constructing an electronic balance as such, the first Roberval's chain 1 mainly supports an offset load in the first direction (X), and the second Roberval's chain 6 mainly supports an offset load in the second direction (Y). Thereby, offset errors in the first and second directions (X and Y) are individually adjusted by adjusting the first and second Roberval's chains (1 and 6), respectively. Consequently, the offset errors is easily adjusted, and the stiffness in the transverse direction (the second direction (Y)) is effectively reinforced.

Thus, when a load which is offset in the transverse direction (the second direction (Y)) of the first Roberval's chain 1 is applied on the balance pan, the second Roberval's chain 6 receives the torsional force exerted on the first Roberval's chain 1. Namely, even if the first Roberval's chain 1 has a relatively low stiffness in its transverse direction (the second direction (Y)), the second Roberval's chain has enough stiffness in that second direction (Y) to support the offset load. Thus, even if an electronic balance utilizes Roberval's chains of the single piece construction type, the offset errors in the first and second directions (X and Y) are reduced, and so the electronic balance with highly accuracy can be obtained.

Furthermore, because the first Roberval's chain 1 mainly supports an offset load in the first direction (X) and the second Roberval's chain 6 mainly supports an offset load in the second direction (Y), an adjustment of the offset error in each direction is independently made with respect to the first and second Roberval's chains (1 and 6) by correcting offset error in their respective longitudinal directions. Hence, the offset errors in the first and second directions (X and Y) are adjusted, and their adjustments do not affect each other.

Additionally, because the second Roberval's chain 6 does not need to have an enough stiffness in its transverse direction (the first direction (X)) as described above, the second Roberval's chain 6 may be made of the single plate. Thus, the cost and size of the second Roberval's chain 6 or in turn, the electronic balance, becomes small.

Figure 3:
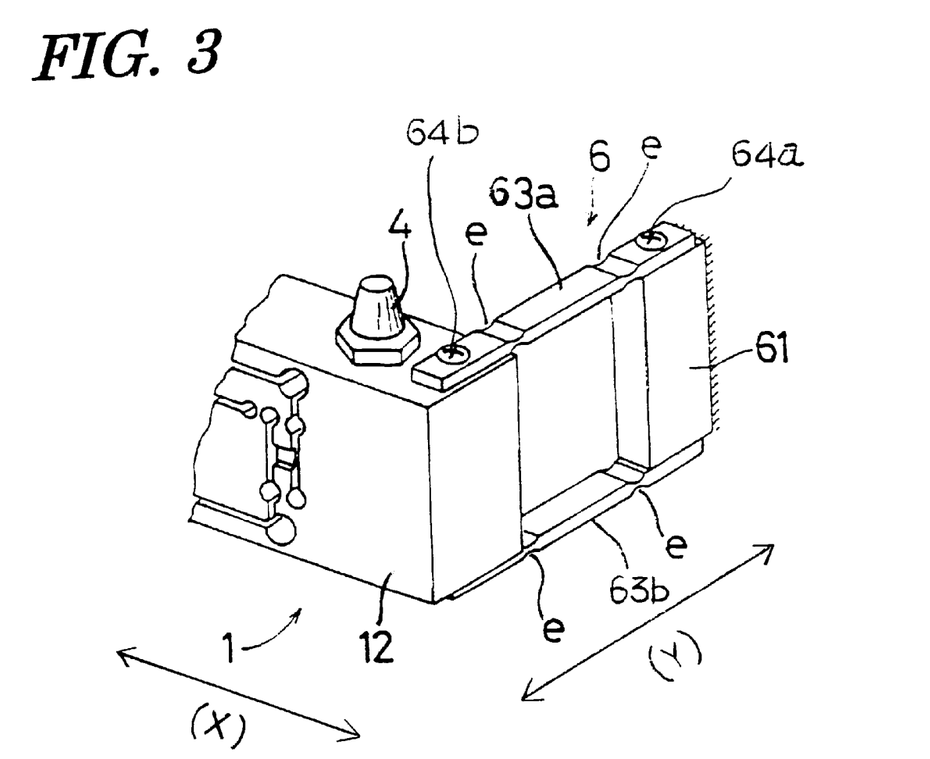
FIG. 3 is a perspective view of first and second Roberval's chains of an electronic balance according to a second embodiment of the present invention.

FIG. 3 is a perspective view of first and second Roberval's chains of an electronic balance according to a second embodiment of the present invention. Although the first embodiment described above uses the single piece construction for the second Roberval's chain 6, the present invention is not limited as such. Referring to FIG. 3, the second Roberval's chain 6 includes a second fixed pillar 61, and second upper and lower beams (63*a* and 63*b*). In the second embodiment of the present invention, the second fixed pillar 61 as well as the second upper and lower beams (63*a* and 63*b*) are separate parts, and the second Roberval's chain 6 is assembled from those separate parts. Namely, one end of each of the second upper and lower beams (63*a* and 63*b*) is connected to the second fixed pillar 61 via a screw (64*a*), and the other end of each of the second upper and lower beams (63*a* and 63*b*) is connected to the first movable pillar 12 of the first Roberval's chain 1 via a screw (64*b*). In the second embodiment, the first movable pillar 12 of the first Roberval's chain 1 also operates as a second movable pillar of the second Roberval's chain 6. The second Roberval's chain 6 in the second embodiment is as effective as that of the first embodiment.

Although the second beams (63*a* and 63*b*) in FIG. 3 do not have the thin portions (t), they may include the thin portions (t) as shown in FIGS. 1 and 2. However, if the tilting of the movable pillar 12 in the first direction (X) does not cause and problems, the thin portions (t) are not necessary in both the first and second embodiments.

When the offset load is applied on the balance pan in the first direction (X), the offset load tends to tilt the movable pillar 12 in the first direction (X), By constructing the second Roberval's chain 6 as such, the thin portions absorb such a tilting force and thus prevent its effect on the second Roberval's chain 6.

Figure 4:
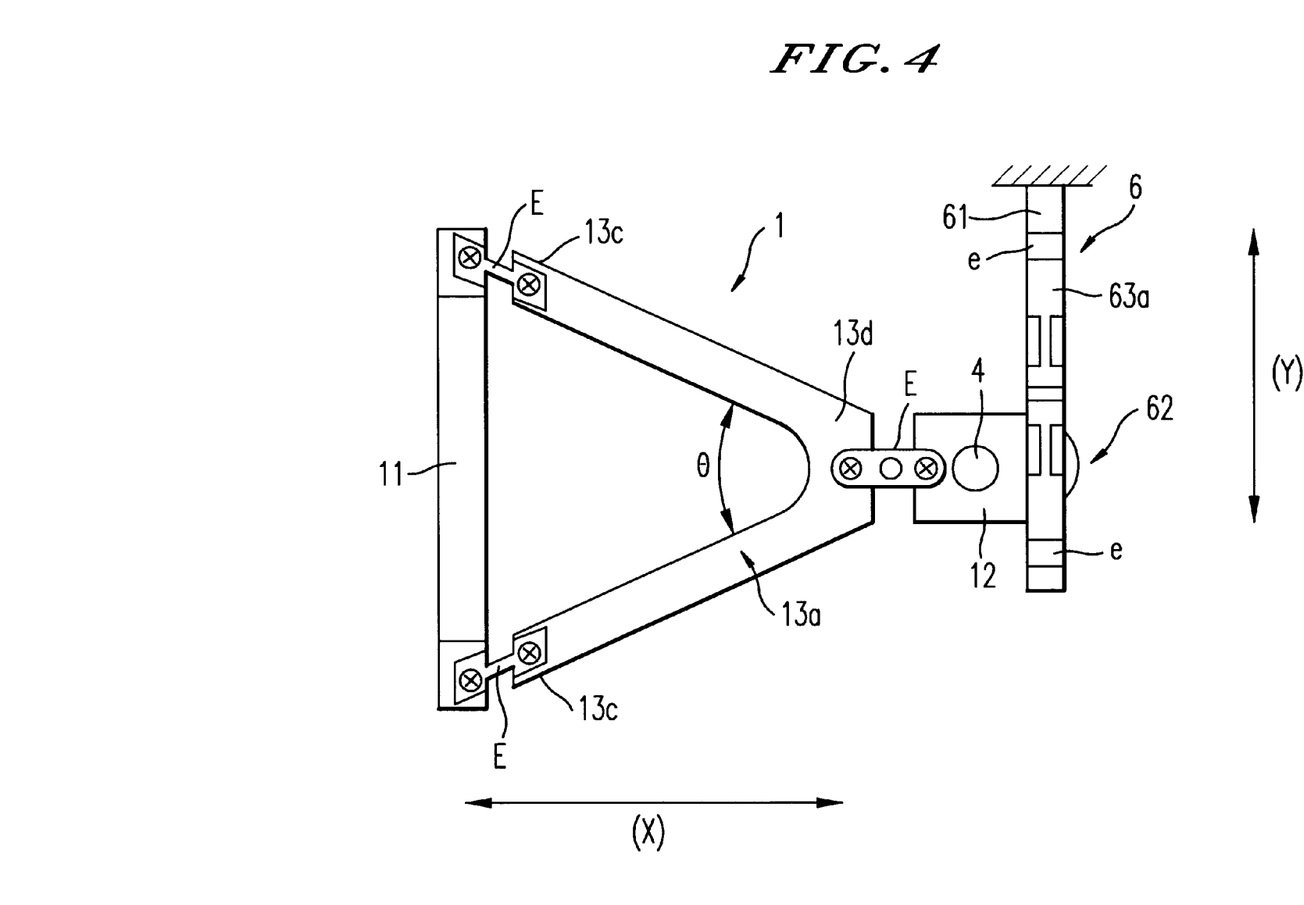
FIG. 4 is a top plan view of first and second Roberval's chains of an electronic balance according to a third embodiment of the present invention.
Figure 5:
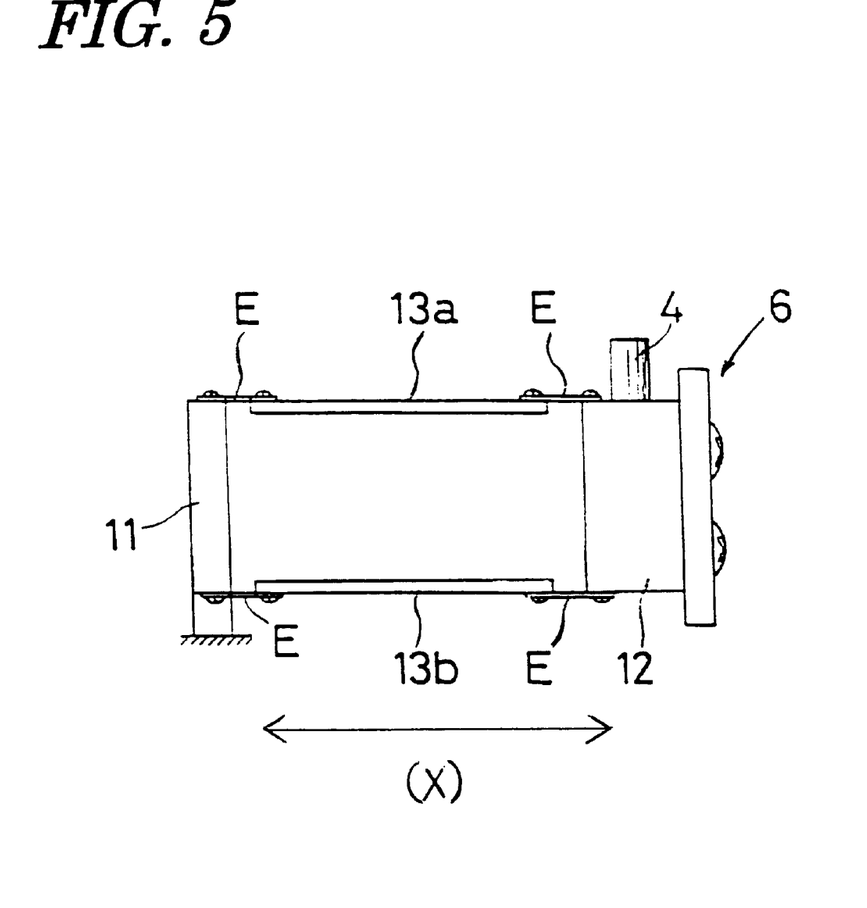
FIG. 5 is a side view of the first and second Roberval's chains shown in FIG. 4.

Likewise, the first Roberval's chain 1 does not need to be limited to the single piece construction. FIGS. 4 and 5 show first and second Roberval's chains (1 and 6) of an electronic balance according to a third embodiment of the present invention. In the third embodiment, the first Roberval's chain 1 includes a first fixed pillar 11, a first movable pillar 12, and first upper and lower V-shaped beams (13*a* and 13*b*). Similar to the second embodiment, the first fixed pillar 11, the first movable pillar 12, and the first upper and lower V-shaped beams (13*a* and 13*b*) are separate parts which are assembled into the first Roberval's chain 1. Namely, two end portions (13*c*) of each of the first upper and lower V-shaped beams (13*a* and 13*b*) are connected to the first fixed pillar 11 via fulcrums (E) to form a triangle. The top end portion (13*d*) of each of the first upper and lower V-shaped beams (13*a* and 13*b*) is connected to the first movable pillar 12 via a fulcrum (E). In the third embodiment, because of the second Roberval's chain 6, the first Roberval's chain 1 does not have to have enough stiffness in the second direction (Y) nor the offset error in the second direction (Y) does not have to be adjusted with respect to the first Roberval's chain 1. Accordingly, even if the angle θ at the top end portion (13*d*) of each of the first upper and lower V-shaped beams (13*a* and 13*b*) is reduced, or even if the first upper and lower beams (13*a* and 13*b*) are straight instead of the V-shape, the scale has small offset errors in the first and second directions (X and Y), resulting in high performance.

Figure 6:
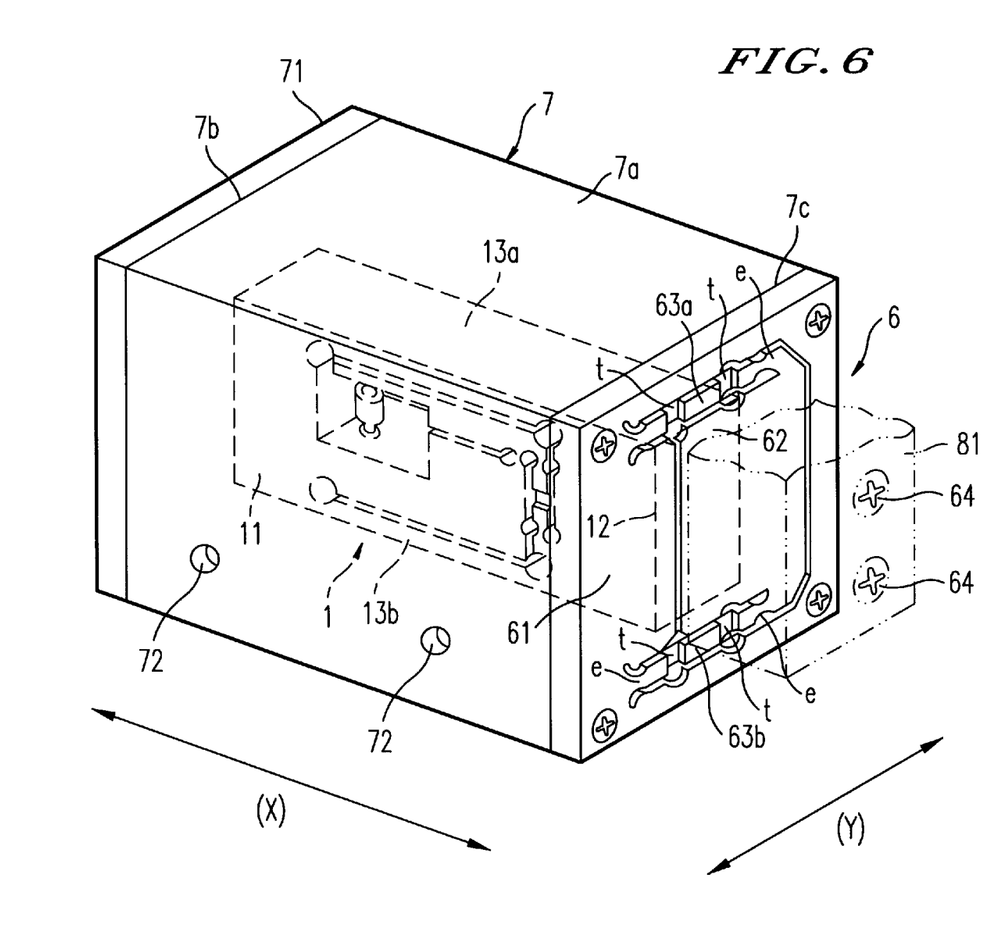
FIG. 6 is a perspective view of a scale which contains an electric balance according to a fourth embodiment of the present invention.
Figure 7:
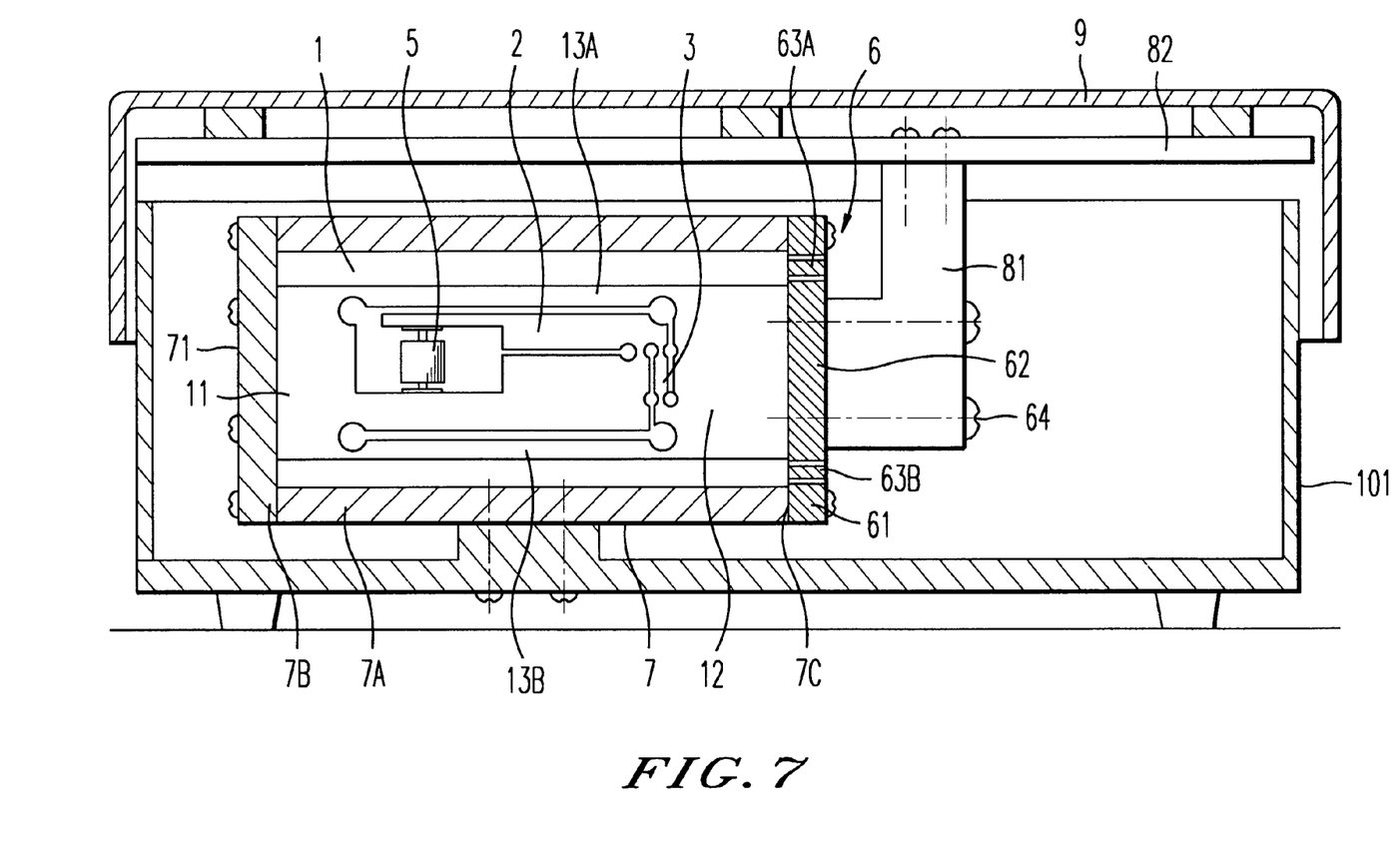
FIG. 7 is a cross-sectional side view of the scale shown in FIG. 6.

FIGS. 6 and 7 show a scale containing an electric balance according to a fourth embodiment of the present invention. Referring to FIGS. 6 and 7, the electric balance is provided in a housing 7. The housing 7 has a circumferential portion (7*a*) and first and second end portions (7*b* and 7*c*). For example, the housing 7 has a square shape and formed of a square pipe. The first Roberval's chain 1 similar to that shown in FIG. 1 is provided in the housing 7, while the second Roberval's chain 6 is mounted on the second end of the housing 7. A support 81 for holding a balance pan receiver 82 is connected to the second movable pillar 62 and to the first movable pillar 11 by screws 64. The balance pan receiver 82 has a flat plate form and is fixedly provided on the top of the support 81. A balance pan 9 is provided on the top of the balance pan receiver 82.

In the fourth embodiment, the second fixed pillar 61 of the second Roberval's chain 6 extends along the periphery of the square second Roberval's chain 6 to surround the outsides of the second upper and lower beams (63a and 63b) and the outside of the second movable pillar 62. As such, the second fixed pillar 61 has a quadrilateral form and is connected to the first end (7b) of the housing 7 by screws. The first fixed pillar 11 of the first Roberval's chain 1 is fixedly mounted on a lid 71 which is fixed onto the first end (7b) of the housing 7. In addition, the housing 7 includes apertures 72 which are designed to accommodate a file. Thus, when the first Roberval's chain 1 requires an adjustment of the offset errors, a file is inserted from the apertures 72 in order to grind off some portions of the fulcrums (E).

A balance case 101 has a box shape and an open top. The housing 7 with the first and second Roberval's chain (1 and 6) is inserted into and fixed to the balance case 101. The support 81 extends to the outside of the balance case 101 from its opening at the top. The balance pan receiver 82 and balance pan 9 is provided over the balance case 101 so that the open top of the balance case 101 is covered entirely. According to the fourth embodiment of the present invention, the offset errors in the second direction (Y) are reduced by the second Roberval's chain 6, notwithstanding both the balance pan 9 with a large surface and the first Roberval's chain 1 having a relatively small width in the second direction (Y). Further, because the housing 7 which is made of a square pipe has high torsional rigidity, the relative positions between the first and second fixed pillars (11 and 61) are maintained even if a large offset load is exerted on the scale. As a result, the first and second Roberval's chains (1 and 6) possess high torsional rigidity, and effectively reduce the offset errors in their respective longitudinal directions.

To make the second Roberval's chain 6 effectively function, the second Roberval's chain 6 may resort to the strength of a square pipe housing 7. Thus, the first Roberval's chain 1 is provided inside a square pipe housing 7 along its axis while the second Roberval's chain is mounted on the second end (7c) of the square pipe housing 7. Accordingly, the strength of the square pipe housing 7 against distortion prevents the first and second Roberval's chains (1 and 6) from shifting from their relative positions when an offset load is applied to the electronic balance. As a consequence, the electronic balance becomes compact and has high strength as well as performance.

Figure 8:
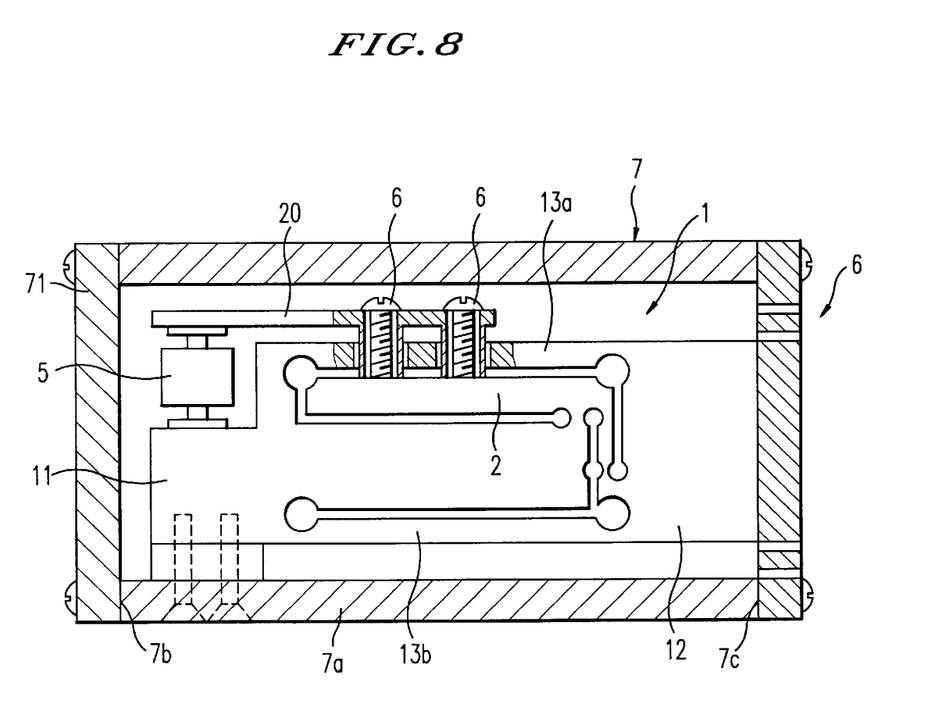
FIG. 8 is a cross-sectional side view of a square pipe provided with a Roberval's chains of an electronic balance according to a fifth embodiment of the present invention.

FIG. 8 is a cross-sectional side view of a square pipe provided with a Roberval's chains of an electronic balance according to a fifth embodiment of the present invention. In the fourth embodiment, the first fixed pillar 11 of the first Roberval's chain 1 is fixed to the lid 71. In the fifth embodiment, referring to FIG. 8, the first fixed pillar 11 of the first Roberval's chain 1 is fixed to an inner wall of the circumferential portion (7a) of the square pipe housing 7. Also referring to FIG. 8, the first Roberval's chain 1 includes an additional lever 20 in addition to the lever 2. The additional lever 20 is connected to the lever 2 by screws 66 and engaged with the load sensor 5. The tilt of the lever 2 is transmitted to the load sensor 5 via the additional lever 20. Along this line, every embodiment described thus far may obviously adapt the second lever 20 as well as other modifications and variations.

Figure 9:
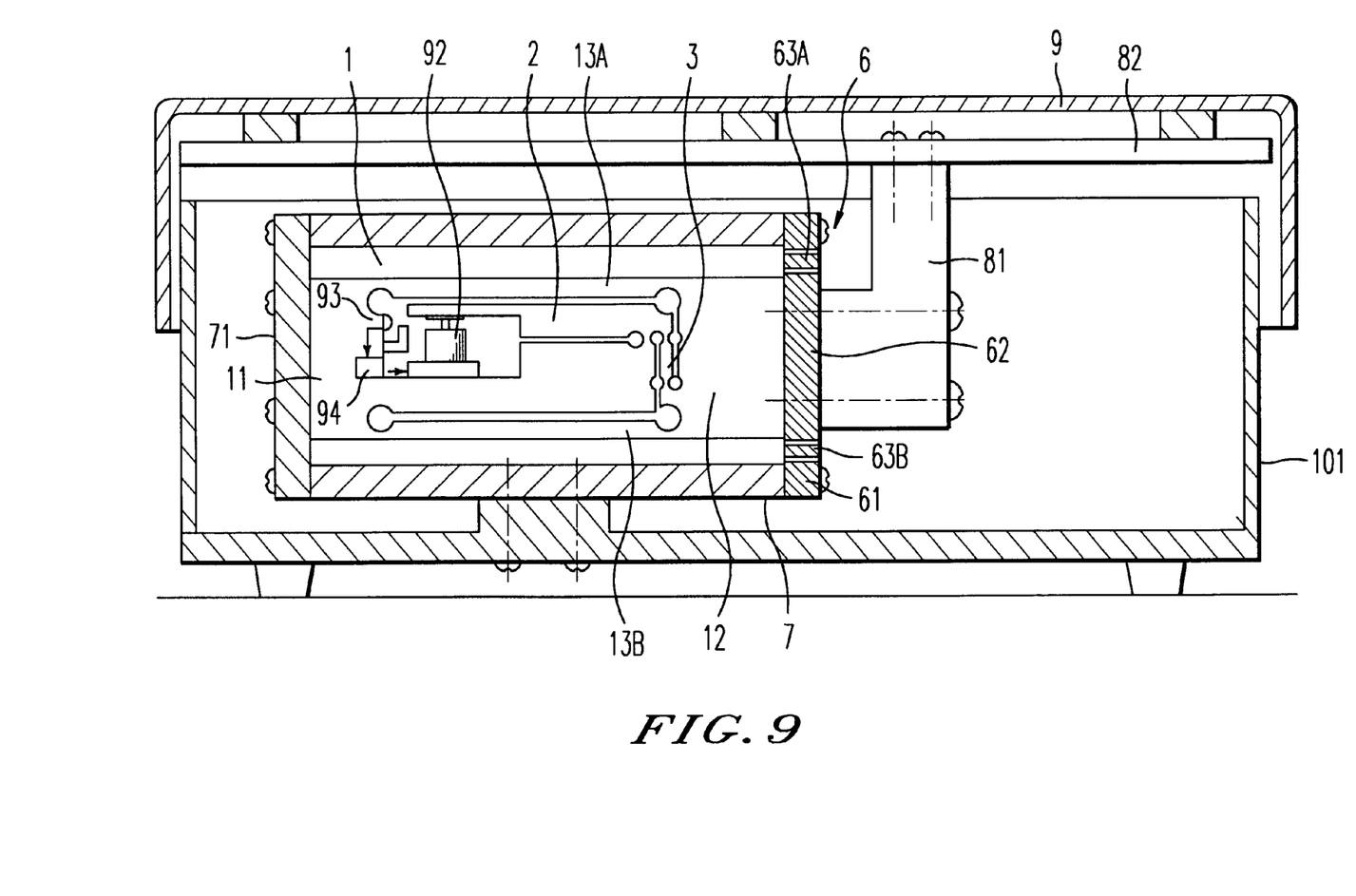
FIG. 9 is a cross-sectional side view of a scale which contains an electronic balance according to a sixth embodiment of the present invention.

FIG. 9 is a cross-sectional side view of a scale which contains an electronic balance according to a sixth embodiment of the present invention. Referring to FIG. 9, the electronic balance includes an electromagnetic restoring system to detect a load applied to the balance pan 9. The electronic balance includes a servomotor 92 and a displacement sensor 93. When a mass is placed on the balance pan 9, the displacement sensor 93 detects a displacement of the lever 2 and send a displacement signal to the control circuit 94 that generates a correction current. This correction current flows through the servomotor 92. The correction current is controlled such that the servomotor 92 restores the lever 2 to its initial position.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. An electronic balance comprising:
   a first Roberval's chain comprising:
   (1) a first fixed pillar;
   (2) a plurality of first beams extending substantially in parallel with each other and in a first extending direction; and
   (3) a first movable pillar supported by said first fixed pillar via said plurality of first beams and configured to receive a load to be measured;
   a second Roberval's chain connected to the first Roberval's chain and comprising:
   (1) a second fixed pillar;
   (2) a plurality of second beams extending substantially in parallel with each other and in a second extending direction substantially perpendicular to the first extending direction of said plurality of first beams; and
   (3) a second movable pillar supported by said second fixed pillar via said plurality of second beams, said second movable pillar being connected to said first movable pillar; and
   a detector configured to detect the load electrically via a movement of said first movable pillar.

2. An electronic balance according to claim 1, wherein said plurality of first beams comprises first upper and lower beams.

3. An electronic balance according to claim 1, wherein said plurality of second beams comprises second upper and lower beams.

4. An electronic balance according to claim 1, wherein said first Roberval's chain is formed from a single plate.

5. An electronic balance according to claim 1, wherein said second Roberval's chain is formed from a single plate.

6. An electronic balance according to claim 1, wherein said second movable pillar is connected to said first movable pillar via at least one screw.

7. An electronic balance according to claim 1, wherein each of said plurality of second beams has at least one thin portion which has a narrow width in the first extending direction of said plurality of first beams.

8. An electronic balance according to claim 1, wherein said Roberval's chain is assembled from separate pieces of the first movable pillar, the plurality of first beams, and the first movable pillar.

9. An electronic balance according to claim 8, wherein each of the plurality of first beams has a V-shape.

10. An electronic balance according to claim 9, wherein each of the plurality of first beams comprises,
   two end portions of the V-shape connected to said first fixed pillar; and
   a top end portion of the V-shape connected to said first movable pillar.

11. An electronic balance according to claim 1, wherein said second Roberval's chain is assembled from separate pieces of the second fixed pillar, the plurality of second beams, and the second movable pillar.

12. An electronic balance according to claim 11, wherein the second fixed pillar is connected to the first movable pillar via the plurality of second beams.

13. An electronic balance according to claim 1, wherein the first movable pillar of the first Roberval's chain also operates as a second movable pillar of the second Roberval's chain.

14. An electronic balance according to claim 1, wherein said detector comprises a load sensor.

15. An electronic balance according to claim 1, wherein said detector comprises an electromagnetic restoring system.

16. An electronic balance according to claim 1, wherein said first movable pillar further comprises:
   a lever which is engaged with the detector and via which the detector detects the load.

17. An electronic balance according to claim 1, wherein said first movable pillar further comprises:
   a first lever connected to the first movable pillar; and
   a second lever connected to the first lever and engaged with the detector, the detector detecting the load via the first and second levers.

18. A scale comprising:
   a housing having a circumferential portion, and first and second side portions at both ends of the circumferential portion; and
   an electronic balance provided in the housing and comprising:
      a first Roberval's chain comprising:
         (1) a first fixed pillar fixed to the housing;
         (2) a plurality of first beams extending substantially in parallel with each other and in a first extending direction; and
         (3) a first movable pillar supported by said first fixed pillar via said plurality of first beams and configured to receive a load to be measured;
      a second Roberval's chain connected to the first Roberval's chain and comprising:
         (1) a second pillar fixed to the housing;
         (2) a plurality of second beams extending substantially in parallel with each other and in a second extending direction substantially perpendicular to the first extending direction of said plurality of first beams; and
         (3) a second movable pillar supported by said second fixed pillar via said plurality of second beams, said second movable pillar being connected to said first movable pillar; and
      a detector configured to detect the load electrically via a movement of said first movable pillar.

19. A scale according to claim 18, wherein the first fixed pillar of the first Roberval's chain is fixed to the first side portion of the housing, and the second fixed pillar of the second Roberval's chain is fixed to the second side portion of the housing.

20. A scale according to claim 18, wherein the first fixed pillar is fixed to an inner wall of the circumferential portion of the housing.

21. A scale according to claim 18, wherein the circumferential portion of the housing has a square shape.

22. An electronic balance comprising:
   a first Roberval's chain comprising:
      (1) a first fixed pillar;
      (2) a plurality of first beams extending substantially in parallel with each other and in a first extending direction; and
      (3) a first movable pillar supported by said first fixed pillar via said plurality of first beams and configured to receive in a loading direction a load to be measured;
   a second Roberval's chain connected to the first Roberval's chain and comprising:
      (1) a second fixed pillar;
      (2) a plurality of second beams extending substantially in parallel with each other and in a second extending direction substantially perpendicular to the first extending direction of said plurality of first beams; and
      (3) a second movable pillar supported by said second fixed pillar via said plurality of second beams, said second movable pillar being connected to said first movable pillar; and
   a detector configured to detect the load electrically via a movement of said first movable pillar, wherein
   the loading direction is substantially perpendicular to the first and second extending directions.

23. A scale comprising:
   a housing having a circumferential portion, and first and second side portions at both ends of the circumferential portion; and
   an electronic balance provided in the housing and comprising:
      a first Roberval's chain comprising:
         (1) a first fixed pillar fixed to the housing;
         (2) a plurality of first beams extending substantially in parallel with each other and in a first extending direction; and
         (3) a first movable pillar supported by said first fixed pillar via said plurality of first beams and configured to receive in a loading direction a load to be measured;
      a second Roberval's chain connected to the first Roberval's chain and comprising:
         (1) a second fixed pillar fixed to the housing;
         (2) a plurality of second beams extending substantially in parallel with each other and in a second extending direction substantially perpendicular to the first extending direction of said plurality of first beams; and
         (3) a second movable pillar supported by said second fixed pillar via said plurality of second beams, said second movable pillar being connected to said first movable pillar; and
      a detector configured to detect the load electrically via a movement of said first movable pillar, wherein the loading direction is substantially perpendicular to the first and second extending directions.

* * * * *